United States Patent [19]

Lahmeyer

[11] Patent Number: 4,766,533
[45] Date of Patent: Aug. 23, 1988

[54] NANOSEQUENCER DIGITAL LOGIC CONTROLLER

[75] Inventor: Charles R. Lahmeyer, Temple City, Calif.

[73] Assignee: The United States of America as represented by the United States National Aeronautics and Space Administration, Washington, D.C.

[21] Appl. No.: 4,282

[22] Filed: Jan. 5, 1987

Related U.S. Application Data

[63] Continuation of Ser. No. 587,749, Mar. 9, 1984, abandoned.

[51] Int. Cl.⁴ .............................................. G06F 9/26
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,445,818 | 8/1966 | Yen | 340/172.5 |
| 3,972,024 | 7/1976 | Schroeder et al. | 340/172.5 |
| 3,978,454 | 8/1976 | Willard | 340/172.5 |
| 3,980,992 | 9/1976 | Levy et al. | 340/172.5 |
| 4,005,391 | 1/1977 | MacPherson | 340/172.5 |
| 4,070,703 | 1/1978 | Negi | 364/200 |
| 4,075,687 | 2/1978 | Nissen et al. | 364/200 |
| 4,155,120 | 5/1979 | Keefer et al. | 364/200 |
| 4,159,520 | 6/1979 | Prioste | 364/200 |
| 4,161,026 | 7/1979 | Wilhite | 364/200 |
| 4,168,523 | 9/1979 | Chari et al. | 364/200 |
| 4,210,960 | 7/1980 | Borgerson et al. | 364/200 |
| 4,212,060 | 7/1980 | Prey | 364/200 |
| 4,270,184 | 5/1981 | Shimokawa | 364/900 |
| 4,271,484 | 6/1981 | Peters et al. | 364/900 |
| 4,276,610 | 6/1981 | Fleck | 364/900 |
| 4,279,016 | 7/1981 | Leininger et al. | 364/200 |
| 4,307,445 | 12/1981 | Tredennick et al. | 364/200 |
| 4,310,888 | 1/1982 | Gehman | 364/200 |
| 4,317,170 | 2/1982 | Wada et al. | 364/200 |
| 4,320,453 | 3/1982 | Roberts et al. | 364/200 |
| 4,330,823 | 5/1982 | Retter | 364/200 |
| 4,370,729 | 1/1983 | Bosch | 364/200 |
| 4,373,180 | 2/1983 | Linde | 364/200 |
| 4,379,328 | 4/1983 | Catiller et al. | 364/200 |
| 4,467,444 | 8/1984 | Harmon, Jr. et al. | 364/900 |

Primary Examiner—Gary V. Harkcom
Assistant Examiner—Christopher H. Lynt
Attorney, Agent, or Firm—Paul F. McCaul; Thomas H. Jones; John R. Manning

[57] ABSTRACT

A digital logic controller providing instruction execution times on the order of 50 nanoseconds and employing a read-only memory outputting instructions to a pipeline register, a portion of each instruction providing a status-select control signal and address signals for controlling selection of the next instruction from the read-only memory.

13 Claims, 2 Drawing Sheets

NANOSEQUENCER DIGITAL LOGIC CONTROLLER

ORIGIN OF THE INVENTION

The invention described herein was made in the performance of work under a NASA Contract and is subject to the provisions of Section 305 of the National Aeronautics and Space Act of 1958, Public Law 85-568 (72 STAT 435; 43 USC 2457).

This application is a continuation, of application Ser. No. 587,749, filed 3-9-84 now abandoned.

FIELD OF THE INVENTION

The subject invention relates generally to digital logic controllers and more specifically to a high-speed digital logic controller providing instruction execution times on the order of 50 nanoseconds.

BACKGROUND OF THE INVENTION

Digital logic controllers are known in the prior art such as the well-known AMD 2900 based microsequence controller. Microsequencer controllers, while offering a wide range of capabilities, suffer from the disadvantages of complexity, high chip count, and an operating speed limited by the use of conventional operational procedures.

SUMMARY OF THE INVENTION

It is therefore an object of the invention to provide an improved digital logic controller design.

It is another object of the invention to reduce component count and increase speed of a digital logic controller.

These and other objects and advantages are achieved according to the invention by a digital logic controller employing a fast access memory and special purpose dedicated programming. Instructions are read from the memory to a pipeline register. The instructions provide logic control signals, next address signals and status-select signals. The next address signals are fed back to the address inputs of the memory and the status select lines are used to select an enable signal for a selected section of the memory. Together the enable signal and next address signals select the next instruction.

DETAILED DESCRIPTION OF THE PREFERRED EMBODIMENT

Figure 1:
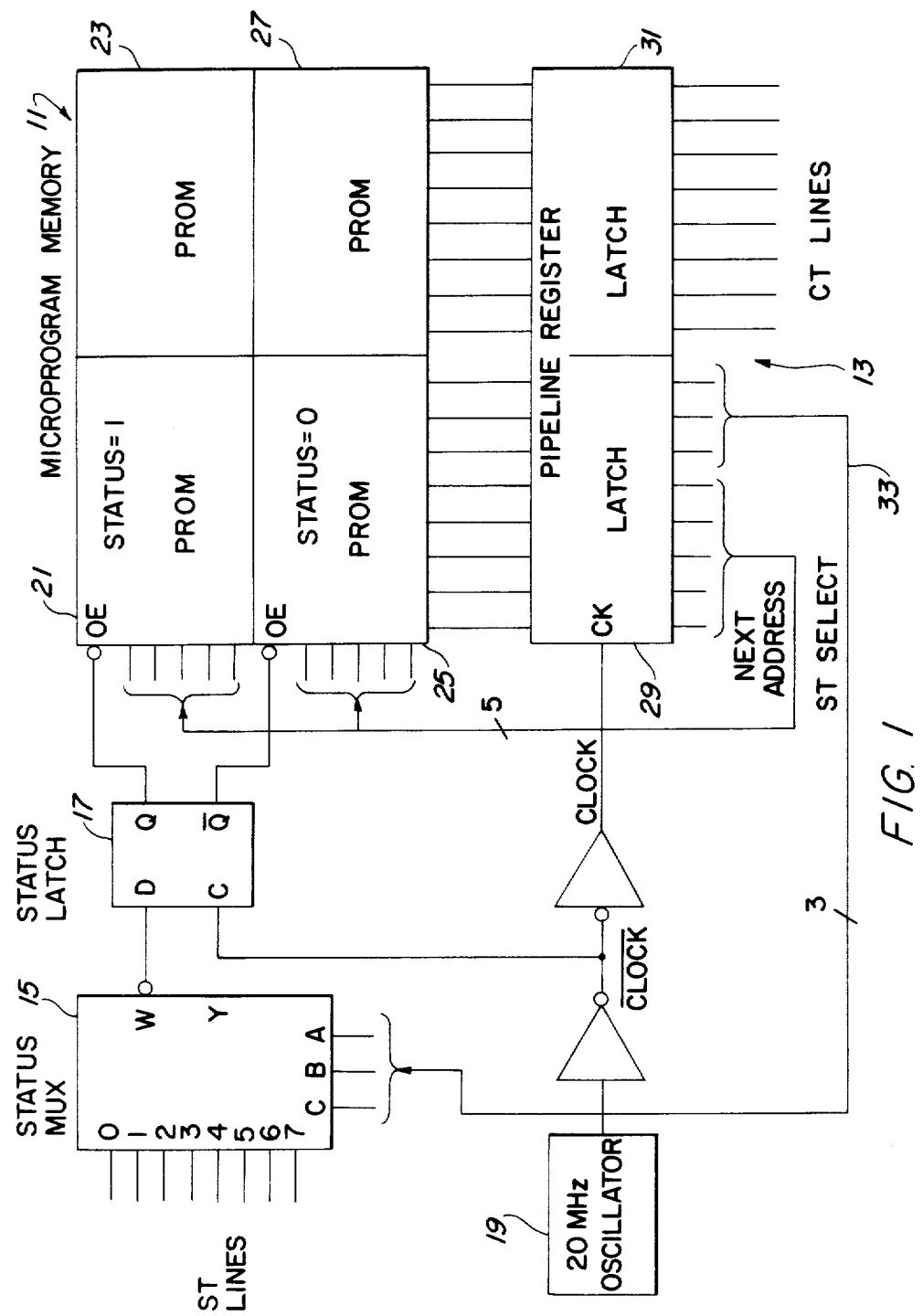
FIG. 1 is a circuit schematic of the preferred embodiment of the invention.

As illustrated in FIG. 1, the preferred embodiment, referred to herein as a nanosequencer, employs a microprogram memory 11, a pipeline register 13, a status multiplexer 15, a status latch 17 and a clock 19.

The microprogram memory 11 stores the program to be executed. In this example, the memory consists of four bipolar PROM chips 21, 23, 25, 27 of type 74S288. The 74S288 is a 32 by 8-bit memory with a very fast 12 ns (nanosecond) access time from the "output enable" (OE) pin. For fast operation, the status bit Q, $\bar{Q}$ from the status latch 17 drives the OE pin of the PROM chips.

The pipeline register 13 stores the microinstruction while it is being executed. Type 74S374 octal latches may be used according to the preferred embodiment. The left-most chip 29 contains information about the next instruction to be selected. The rightmost device 31 contains the instantaneous control states on control lines CT.

The status multiplexer 15 selects the status line whose state is to be sampled for conditional instructions. A 74S251 eight-line multiplexer is used which requires 3 bits of the microinstruction to select one out of eight status-line inputs.

The status latch 17 stores the state of the sampled status input and applies it to the microprogram memory 11 to complete the selection of the next instruction. The clock 19 includes a crystal oscillator and inverter to produce CLOCK and its inverse, $\overline{\text{CLOCK}}$.

The function of the nanosequencer of FIG. 1 is to exercise the output control lines (CT lines) in a systematic way based upon the condition of the input status lines (ST lines). In order to accomplish this, the objective of the nanosequencer is to select the next instruction which will be loaded into the pipeline register 13 and then executed. Briefly, the steps in one instruction cycle are:

1. Strobe an instruction into the pipeline register 13.
2. Select the appropriate status line and store its state in the status latch 17.
3. Select the next instruction from the microprogram memory 11.

During this sequence, the instruction currently in the pipeline register 13 is being executed in the external circuitry. "Executed" here has nothing to do with the microinstruction opcode, but is the action which results from the CT lines which are active.

Figure 2:
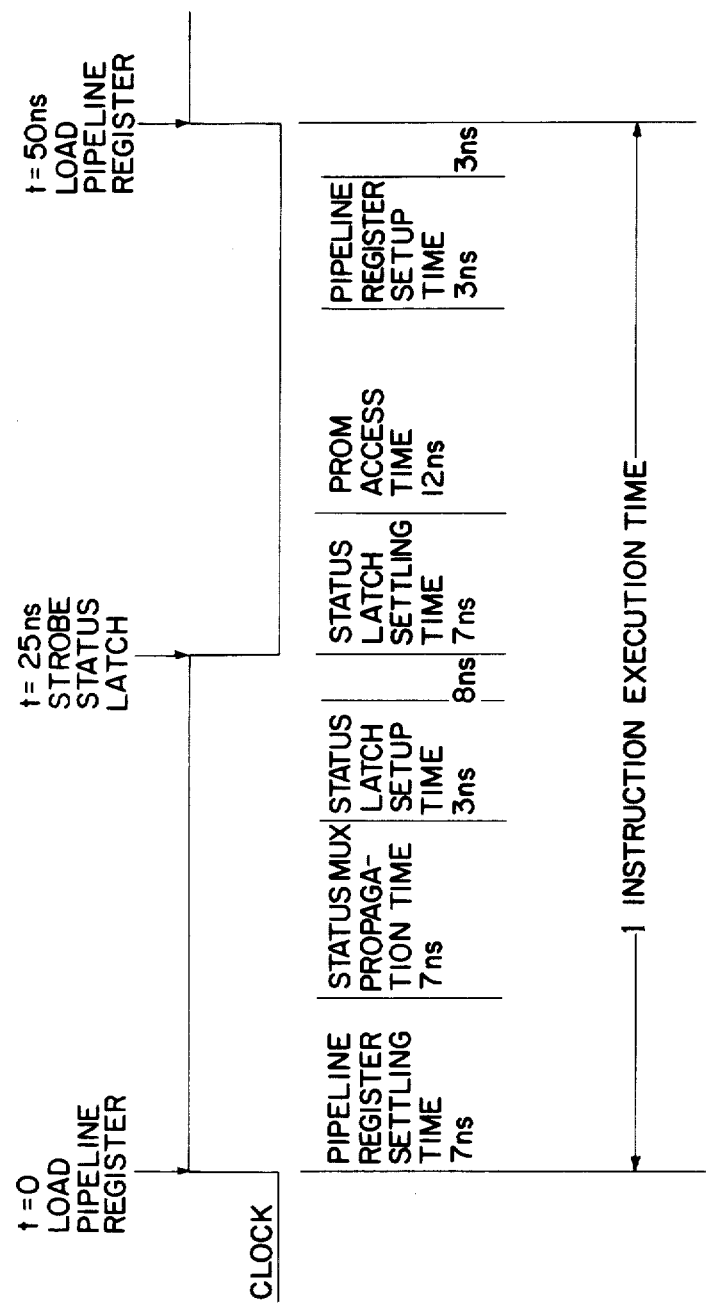
FIG. 2 is a timing diagram illustrating steps in the execution of an instruction according to the preferred embodiment.

The sequence of events which occurs during one execution time and which leads to the selection of the next instruction is shown in detail in FIG. 2. Beginning at t=0, the pipeline register 13 is strobed by the leading edge of the clock 19. At this time, the actual execution of the instruction begins, i.e., the raising of the appropriate CT lines. The first 8 bits of the instruction are used to select the next instruction. The example under consideration uses a 20 MHz clock rate, which results in a microinstruction execution time of 50 ns.

The first five bits from the pipeline register 13 are fed back to the address lines of all the memory chips 21, 23, 25, 27. Because the memory 11 is 32 words deep, only five address lines are required. These five lines, however, are not sufficient to determine what the next instruction will be since one instruction is stored in the upper two PROMs 21, 23, and another quite different instruction may be stored in the lower two PROMs 25, 27. The final decision as to which one to use is based on the status bit Q, $\bar{Q}$. For this purpose, the three status-select bits on line 33 select one of the eight ST line inputs to be applied to the "D" input line of the status latch 17.

From the time that instruction execution begins with the loading of the pipeline register 13, three delay times elapse before the $\overline{\text{CLOCK}}$ signal strobes the status latch 17. First, the outputs of the pipeline register 13 must settle. Second, the selected ST signal must propagate through the status multiplexer 15 and arrive at the status latch 17 at a point in time 3 nanoseconds before it is strobed. After the rising edge of $\overline{\text{CLOCK}}$ strobes the status latch 17, the Q and $\bar{Q}$ outputs of the status latch 17 enable the appropriate OE line to produce the next instruction to be selected and applied to the inputs of the pipeline register 13. Three delays are seen during this half of the cycle. These are the time required for the latch 17 outputs to settle, the access time of the PROMs 21, 23, 25, 27 (from OE), and the set-up time of the pipeline register 13. After these three delays, the CLOCK signal rises and the next instruction is loaded into the pipeline register 13. This completes the cycle. While this selection process is occurring, the actual "execution" of the instruction is being carried out by the CT lines.

The programming language used by the nanosequencer is as follows:
1. JP—Jump (unconditional)
2. CJP—Conditional Jump
3. CNJP—Conditional Non-Jump
4. JZ—Jump to Zero
5. CONT—Continue (no-op)

The . —4 designation shows that control will be transferred backwards four instructions from the current address. A label can also be used in this field.

Finally, "83" represents the CT lines to be raised. This is the hexadecimal representation of eight binary bits which stand for the eight CT lines. In this case 83H = 10000011 shows that the lines CT1, CT7 and CT8 will be high during this instruction. If only one digit is used, it represents the more significant four bits.

Programs may be up to 32 instructions long and must be terminated by the word END in the instruction field. Fields are separated by spaces or tab characters.

The conversion of microinstruction source code into executable object code is illustrated in Table I below. Column 1 is the address of the microinstruction memory.

TABLE I

| AD | LOW WORD | | HIGH WORD | | LN | LABEL | OP | ST | BA | CT LINES | COMMENT |
|----|----|----|----|----|----|----|----|----|----|----|----|
| 00 | 08 | 00 | 08 | 00 | 00 | DMA | CONT | | | | ,DMA MICROCODE |
| 01 | 08 | 00 | 14 | 00 | 01 | START | CNJP | ST0 | . | | ,WAIT FOR START COMMAND |
| 02 | 14 | 00 | 19 | 80 | 02 | DATA | CNJP | ST4 | . | | ,WAIT FOR DATA REGISTER CLOCK |
| 03 | 19 | 80 | 22 | 40 | 03 | | CNJP | ST1 | . | 8 | ,RAISE DMA REQUEST, WAIT FOR GRANT IN |
| 04 | 2B | 40 | 22 | 40 | 04 | | CJP | ST2 | . | 4 | ,WAIT IF REPLY STILL ACTIVE |
| 05 | 30 | 60 | 2B | 40 | 05 | | CJP | ST3 | . | 4 | ,WAIT IF SYNC STILL ACTIVE |
| 06 | 38 | 60 | 38 | 60 | 06 | ADDR | CONT | | | 6 | ,APPLY ADDRESS TO BUS |
| 07 | 40 | 70 | 40 | 70 | 07 | | CONT | | | 6 | ,100NS DELAY FOR ADDRESS |
| 08 | 4A | 5C | 4A | 5C | 08 | | CONT | | | 7 | ,RAISE SYNC, XMIT ADDRESS |
| 09 | 4A | 5C | 50 | 5C | 09 | WRITE | CNJP | ST2 | . | 5C | ,APPLY DATA TO BUS, RAISE DOUT, WAIT FOR REPLY |
| 0A | 58 | 54 | 58 | 54 | 0A | | CONT | | | 5C | ,HOLD TIME FOR DOUT |
| 0B | 65 | 02 | 65 | 02 | 0B | | CONT | | | 54 | ,DROP DOUT, HOLD DATA ON BUS |
| 0C | 14 | 00 | 68 | 00 | 0C | | CNJP | ST5 | DATA | 02 | ,DROP SYNC AND GRANT OUT, COUNT, TEST FOR CARRY |
| 0D | 08 | 00 | 08 | 00 | 0D | | JP | | START | | ,GO WAIT FOR NEXT START COMMAND |
| C | C | C | C | C | C | | END | | | | |
| O | O | O | O | O | O | | | | | | |
| L | L | L | L | L | L | | | | | | |
| 1 | 2 | 3 | 4 | 5 | 6 | | | | | | |

The JP instruction transfers control to the destination address regardless of the states of the status lines. The CJP instruction will transfer control to the destination address if the ST line tested is high. If it is low, control proceeds to the next instruction in the program. CNJP is the logical complement of CJP. That is, when the tested CT line is low, control transfers to the destination address. Otherwise, control proceeds to the next instruction. JZ returns control to the start of the program (to instruction 00). The CONT instruction is like a no-op in that no branching takes place and control always proceeds to the next instruction in the program.

There are six fields in a coded instruction line; for example:

| BETA | CJP | ST4 | .—4 | 83 | ;Comment |
|------|-----|-----|-----|-----|---------|

In this example, there are eight spaces per field. The number of spaces per field is a function of a particular implementation of the microcode assembler program. The CT field ("83") could easily be much longer.

The significance of these fields is as follows:

BETA is the optional instruction label and is used to refer to this instruction from other parts of the program. The CJP code is the instruction code - in this case, Conditional Jump.

The ST4 designation indicates the status line to be tested in this conditional instruction.

Columns 2, 3, 4 and 5 of Table I represent the object code to be generated and stored in PROM memory chips 25, 27, 21 and 23 of FIG. 1, respectively. Column 6 is the line number for reference.

Line 05 will be analyzed in detail to illustrate how the object code is generated. Assume that line 5 is currently being executed. The object code stored at this address represents two possible next instructions, one of which will be selected during the current instruction cycle. The LOW WORD columns contain the instruction to be executed if the appropriate status line (in this case ST3) is low. Similarly, HIGH WORD is selected if ST3 is high.

The LOW WORD columns contain the instruction listed in line 6, as this is the next instruction to be executed if ST3 is low. The binary equivalent of column 2 is 00110000. The first 5 bits contain 06(hex) which is the next line number. The next 3 bits contain the ST line number needed in line 6. In this case, no ST line is specified in line 6, so these three bits are zero. Column 3 contains 60(hex) which represents the CT lines raised in line 6.

Columns 4 and 5 contain a similar set of data for instruction line 5, the current instruction, since this instruction will be executed again if ST3 is high. Each of the five possible operation codes CJP, CNJP, CONT, JP and JZ will be handled in a similar manner once the two possible next instructions are determined.

The 32-instruction embodiment just described is probably the minimum practical size. It is very fast, operating reliably at 20 MHz, and extremely simple, requiring fewer than 10 MSI chips. This "baseline" circuit has 8 input status lines (ST lines) and 8 output control lines (CT lines), both of which are easily expandable.

The disclosed nanosequencer offers several advantages over conventional microsequencer controllers. It is several times faster and uses about half as many chips. For its speed and simplicity, however, the nanosequencer lacks certain capabilities which a typical microsequencer possesses. Particularly, it does not have an integral repeat counter for looping; and it lacks subroutine capability. However, a repeat counter can be added to the nanosequencer, without difficulty. Subroutinizing has been found unnecessary in most microcontroller applications. In addition, a 256-instruction nanosequencer may be utilized, which reduces the objection to nanosequencers on the basis of program length. The result is that a microsequencer is rarely needed in preference to a nanosequencer. The invention thus provides a powerful, structured approach to the design of digital control logic.

It will be appreciated that the foregoing embodiment is subject to numerous modifications and adaptations without departing from the scope of the invention. Therefore, it should be understood that, within the scope of the appended claims, the invention may be practiced other than as specifically described herein.

What is claimed is:

1. A logic controller receiving a plurality of status line inputs with status states thereof defining conditional instructions to the logic controller and having a single memory access time to access an instruction having a fixed duration instruction execution time, said controller comprising:

a memory means having a plurality of address lines for storing a plurality of instructions and providing a plurality of first output lines, said memory having segments associated with the status of the plurality of status line inputs and having stored therein a plurality of instructions for application to said first output lines with each instruction including separate bit sequences for controlling logic control, status select, and next address lines;

register means connected to and supplied by said plurality of first output lines for receiving an instruction from said memory means and providing said instruction on a second plurality of output lines, said second plurality of output lines including logic control, status select, and next address lines for respectively emitting said bit sequences received from said memory means thereat;

means connecting said next address lines of said second plurality of output lines from said register means to said plurality of address lines of said memory means;

status control selection means connected to receive said plurality of status line inputs and connected to and controlled by said status select lines of said second plurality of output lines for selecting, once each instruction execution time, one status line input from among said plurality of status line inputs based upon the bit sequence emitted by said register means at said status select lines; and memory enabling means connected between said memory means and said status control selection means and responsive to the status of said selected status line input for enabling the corresponding segment of said memory means based upon said status and said next address signal from said register means to thereby select the next instruction to be accessed from said memory means.

2. The logic controller of claim 1 wherein said memory means is a read-only or programmable read-only memory.

3. The logic controller of claim 1 wherein said memory means provides an access time on the order of 12 nanoseconds.

4. The logic controller of claims 1, 2 or 3 wherein said means for selecting one from among a plurality of status lines comprises multiplexer means.

5. The logic controller of claim 4 wherein said memory enabling means includes status latching means for applying said status signal to said memory means as a memory segment enabling signal.

6. A logic controller in accordance with claim 5 wherein said instruction execution time is divided into two equal first and second parts and further wherein:

said register means has a settling time during the first part of said execution time;

said status latch has a set-up time during said first part; and said multiplexer means has a propagation time in said first part between said register means settling time and said status latch set-up time.

7. A logic controller in accordance with claim 6 and further wherein:

said status latch has a settling time which occurs during said second part of said execution time after said strobe thereto;

said register means has a set-up time which occurs at substantially the end of said execution time; and said memory means has an access time between said status latch settling time and said register means set-up time.

8. A logic controller in accordance with claim 6 and further wherein:

said status latch is strobed from said clock source at about the mid point of said instruction execution time.

9. A logic controller in accordance with claim 8 and further wherein:

said execution time is about 50 nanoseconds.

10. A logic controller in accordance with claim 1 wherein:

said register means comprises a pipeline register.

11. A logic controller in accordance with claim 10 and further comprising:

a clocking source; and means for applying clock signals from said source to said status latch and to said register means.

12. A method of digital logic control, comprising the steps of:

storing a plurality of fixed-time instructions in a memory;

dividing each fixed-time instruction into logic control, next address select and status select portions;

loading one of the fixed-time instructions by a single access of the memory into a pipeline register to start a current instruction execution time;

receiving a plurality of status line inputs;

selecting during the current instruction execution time one status line input from among said plurality of status line inputs based upon the status select portion of the current instruction in said pipeline register;

latching the status of the selected status line during the current instruction execution time;

applying the next address signal to the memory means during the current instruction execution time; and accessing the memory means for the next instruction to be issued at the next instruction execution time based upon the applied address and the latched status of the selected status line.

13. A method of digital logic control in accordance with claim 12 and comprising the additional steps of:

dividing the memory into segments associated with the status conditions appearing on the status line inputs; and enabling the memory segment which matches the latched status.

* * * * *